United States Patent
Matsuda et al.

[11] Patent Number: 5,913,027
[45] Date of Patent: Jun. 15, 1999

[54] DATA PROCESSING METHOD FOR A COMPUTER SYSTEM INCLUDING COMPUTERS CONNECTED VIA A COMMUNICATION PATH TO EACH OTHER AND COMPUTER-READABLE RECORDING MEDIA FOR USE WITH THE COMPUTERS

[75] Inventors: Yoshiki Matsuda, Yokohama; Tetsuya Hashimoto, Tokyo, both of Japan

[73] Assignee: Hitachi, Ltd., Tokyo, Japan

[21] Appl. No.: 08/886,117

[22] Filed: Jun. 30, 1997

[30] Foreign Application Priority Data

Jul. 2, 1996 [JP] Japan .................................. 08-172070

[51] Int. Cl.$^6$ ...................................................... G06F 9/00
[52] U.S. Cl. ...................................................... 395/200.31
[58] Field of Search ..................... 364/DIG. 1, DIG. 2; 395/200.3, 200.31, 200.32, 200.35, 670, 671, 683, 684, 708

[56] References Cited

U.S. PATENT DOCUMENTS 4,949,248  8/1990  Caro ................................... 395/200.33
5,404,527  4/1995  Irwin et al. ......................... 395/200.52
5,603,031  2/1997  White et al. ............................. 395/683
5,652,889  7/1997  Sites ....................................... 395/708

*Primary Examiner*—Robert B. Harrell
*Attorney, Agent, or Firm*—Fay, Sharpe, Beall, Fagan, Minnich & McKee

[57] ABSTRACT

In a computer system including a plurality of mobile code processing systems, the user of a computer can conduct data processing without paying attention to any mobile code processing system received or to any mobile code processing system in the computer. A program repository is arranged in a network such that a plurality of program codes are stored therein in association with the mobile code processing systems. When a mobile code is transferred from a source computer to a destination computer, a name of the processing system is added to the transfer data. On receiving the mobile code, the computer determines whether or not the processing system is provided for the code. If the processing system is missing, the computer acquires from the repository a program code executable in the processing system of the computer. If the processing system is present, the computer executes the mobile code in accordance with the processing system.

7 Claims, 6 Drawing Sheets

DATA PROCESSING METHOD FOR A COMPUTER SYSTEM INCLUDING COMPUTERS CONNECTED VIA A COMMUNICATION PATH TO EACH OTHER AND COMPUTER-READABLE RECORDING MEDIA FOR USE WITH THE COMPUTERS

BACKGROUND OF THE INVENTION

The present invention relates to a data processing method for a computer system including computers connected via a communication path to each other and computer-readable recording media for use with the computers.

Heretofore, the mobile code technology has been known as a technology for data processing in a computer system including various types of computers connected via networks to each other.

In accordance with the mobile code technology, a program code and data to be processed by the program code are transferred via a network such that the program code is executed in a computer optimal for the execution of the code so as to achieve the data processing.

As an example of the mobile code technology, there has been known the remote programming technology of the General Magic Inc. U.S. patent application Ser. No. 08/090, 521, now U.S. Pat. No. 5,603,036.

Utilizing the remote programming technology, it is possible to transfer a program code together with data to a computer optimal for the execution thereof to accomplish the data processing. This resultantly reduce the processing load imposed on the network for the data processing.

Another example of the mobile code technology has been used in the worldwide web (WWW) in which a program code described in a particular language is transferred from a server computer of WWW via a network to a client computer thereof such that the program code is executed by the client computer. This technology has an aspect that the program need not be beforehand delivered to the client computer.

The conventional technologies described above have a feature to decrease the network load for the program execution and an aspect that the program is not required to be transferred to the client computer in advance. However, to obtain such advantages, it is necessary to provide a mobile code processing system including an interpreter capable of processing the mobile code in each computer of the prior art.

In this connection, in a network system such as the present Internet including a large number of various types of computers connected thereto, it is practically impossible to dispose the same mobile code processing system in each computer. Therefore, in the processing of data, the user of each computer is required to pay attention to the types of mobile code processing systems beforehand prepared in the computer.

Similarly, even in one mobile code processing system, it is almost impossible that the same mobile codes respectively have the same version numbers in all computers of the system. Namely, when conducting data processing, the user of each computer is required to pay attention to the mobile code versions.

SUMMARY OF THE INVENTION

It is therefore an object of the present invention to provide a data processing method in which the user of each computer can process data without paying attention to the type and version of a mobile code received via a network as well as those of mobile code processing systems beforehand disposed in the computer.

To achieve the object above in accordance with the present invention, at least one program storage facility, i.e., program repository is arranged in a network. Stored in the repository are program names of programs respectively created in a plurality of different kinds of program code processing systems, program code processing system names used to generate the respective programs, and program codes respectively described in the program code processing systems with a correspondence established between the program names, program code processing system names, and program codes. In each of the computers connected to the network, there is arranged a table including program code processing system names available in the computer. When transferring a program from a first computer via the network to a second computer, the first computer collects a set of data items including a name assigned to a program repository in which the program is stored, a program name of the program, a program code processing system name in which the program is generated, and a program code described in a program code processing system having the program code processing system name. On receiving the program, the second computer examines whether or not the program code processing system name therein exists in the table of program code processing system names. If the name is present therein, the second computer executes data processing described in the program code of the program in accordance with the program code processing system provided in the second computer. Otherwise, the second computer transmits the received program name and the program code processing system name of the second computer to the program repository having the received program code repository name. When there exists a program matching the received program name and program code processing system name, the repository returns a program code corresponding the program name and the program code processing system name to the second computer. On receiving the program code, the second computer executes the program code in accordance with the program code processing system of the second computer.

When there exists a program associated with a program name and a program code processing system name respectively associated with those received from the second computer, the repository transmits to the second computer, in addition to the program code corresponding to the program name and the program code processing system name, program codes related to another program code processing system name.

Moreover, there is arranged in consideration of version numbers at least one program repository in a network. Stored in the repository are program names of program respectively created in a plurality of different kinds of program code processing systems, program code processing system names used to generate the respective programs, version numbers of the respective program code processing systems, and program codes of programs respectively described in the program code processing systems with a correspondence established between the program names, program code processing system names, version numbers thereof, and program codes. In each of the computers connected to the network, there is arranged a table including program code processing system names available in the computer and version numbers respectively assigned thereto. When transferring a program from a first computer via the network to a second computer, the first computer collects a set of data items including a name of a program repository in which the program is stored, a program name of the program, a program code processing system name in which the program is generated, a version number of the processing system, and a program code described in a program code processing system having the program code processing system name. On receiving the program, when the table includes the program code processing system name having the same version number, the second computer executes a program code of the program received from the first computer in accordance with the program code processing system provided therein. Otherwise, the second computer transmits the received program name and the program code processing system name and version number thereof disposed in the second computer to the program repository of the received program code repository name. When there exists a program matching with the received program name, program code processing system name, and version number, the repository returns a program code corresponding the program name, program code processing system name, and version number to the second computer. On receiving the program code, the second computer executes the program code in accordance with the program code processing system of the second computer.

In this situation, when the version number is mismatching therebetween, the repository selects from the program codes associated with the received program name and program code processing system name a program code having a largest version number not exceeding that received from the second computer.

Furthermore, when a program code related to the version number is missing in the repository, the second computer executes by way of trial the program code stored in the received program in accordance with the program code processing system thereof.

According to the present invention as above, a program repository (storage facility) is disposed in a network such that programs to be processed in accordance with the mobile code are stored in the repository. The program code is stored therein according to each mobile code processing system and the version thereof.

In an operation to transfer a program of the mobile code to one computer in the network, data transferred thereto includes a set of data items including a name and a version of a mobile code processing system associated with the program and a name of a program repository in which the program is stored.

Each computer controls the name of mobile code processing systems thereof and the versions respectively of the systems. On receiving a program, the computer determines whether or not the mobile code processing system of the program exists therein. If the system is absent, the computer acquires from the repository a program code executable in the own processing system to thereby execute the program. If the processing system is present therein, the computer directly executes the received program.

Thanks to the provision, the user of each computer can execute the data processing without paying attention to the type of the received mobile code and that of the mobile code processing system provided in the computer in advance.

Similarly, since the version number of the mobile code processing system is also taken into consideration, even when the version number is mismatching, the user can conduct the data processing without giving attention to the version of the mobile code.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given in detail of an embodiment of a computer system in accordance with the present invention.

Figure 1:
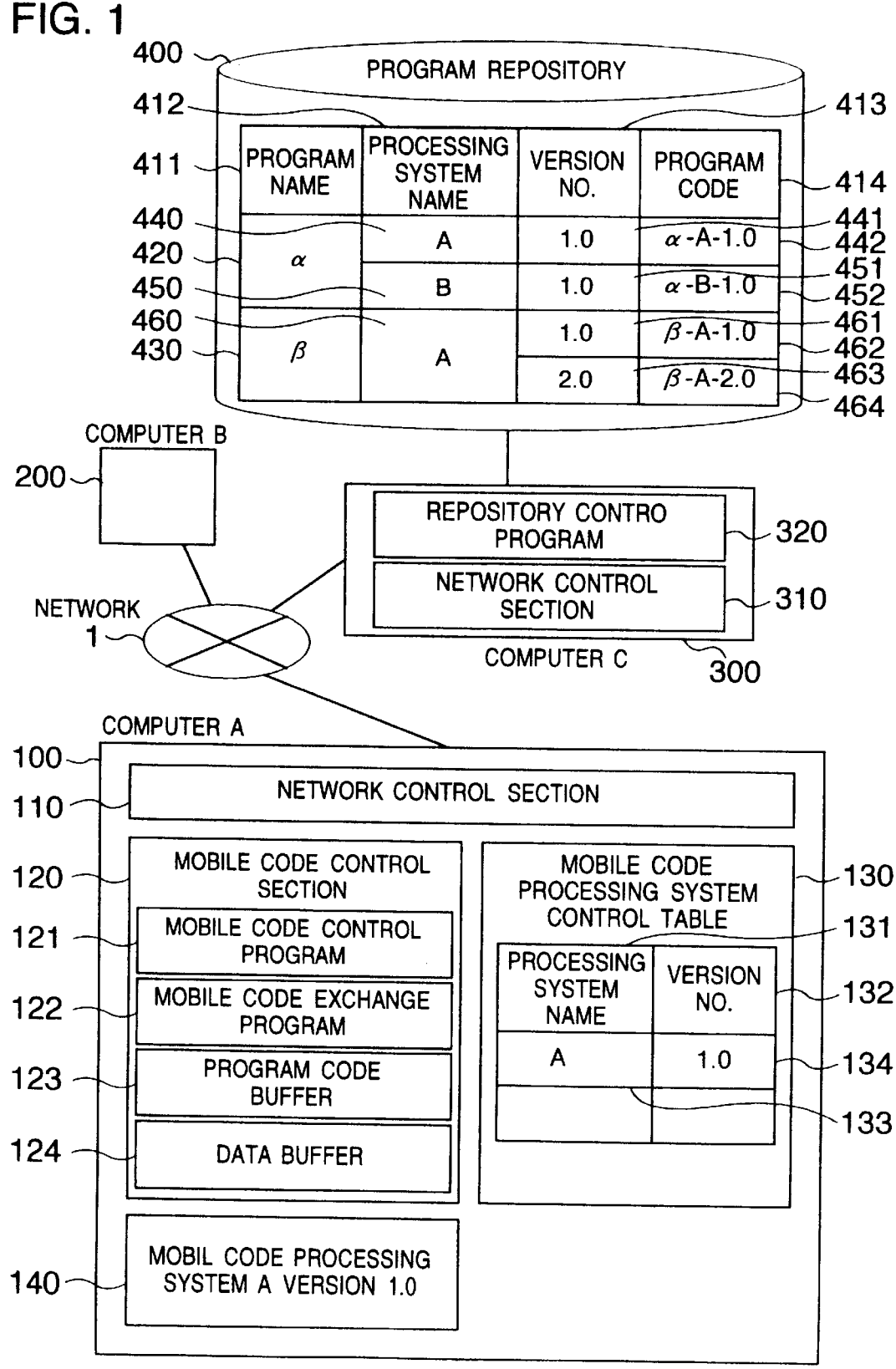
FIG. 1 is a schematic system diagram showing an embodiment of the computer system in accordance with the present invention.

FIG. 1 shows the system configuration of the embodiment in accordance with the present invention.

The system of this embodiment includes a network 1, a plurality of computers A to C, and networks respectively connected to the computers A to C.

The computer A 100 includes a network control section 110, a mobile code control section 120, a mobile code processing system control table 130, and a mobile code processing system A (version 1.0) 140.

The mobile code control section 120 includes a mobile code control program 121, a mobile code exchange program 122, a program code buffer 123, and a data buffer 124.

The mobile code processing system control table 130 includes entries each including a processing system name 131 and a version number 132 thereof prepared for the computer A 100. In this embodiment, "A" and "1.0" are stored respectively as the processing system name 133 and the version number 132.

The computer C 300 includes a network control section 310, a repository control program 320, and a program repository 400. Stored in the program repository 400 are entries each including a program name 411, a processing system name 412, a version number 413, and a program code 414.

In this embodiment, there are stored entries respectively of program names "α" and "β". For program name α 420, "processing system name A 440" and "processing system name B 450" are registered in the table. Namely, "version number 1.0 441" and "program code α-A-1.0 442" are stored for processing system name A and "version number 1.0 451" and "program code α-B-1.0 452" are stored for processing system name B. For program name β, "program code β-A-1.0 462" is stored together with items of "version number 1.0 461" and "program code β-A-1.0 462" as well as items of "version number 2.0 463" and "program code β-A-2.0 464".

(1) First, description will be given of a case in which when a computer receives a mobile code transferred from a communicating partner computer, a processing system is missing for the mobile code in the computer. As a specific example of this case, description will be given of a data processing flow for the network transfer package A 500 shown in FIG. 2.

Figure 2:
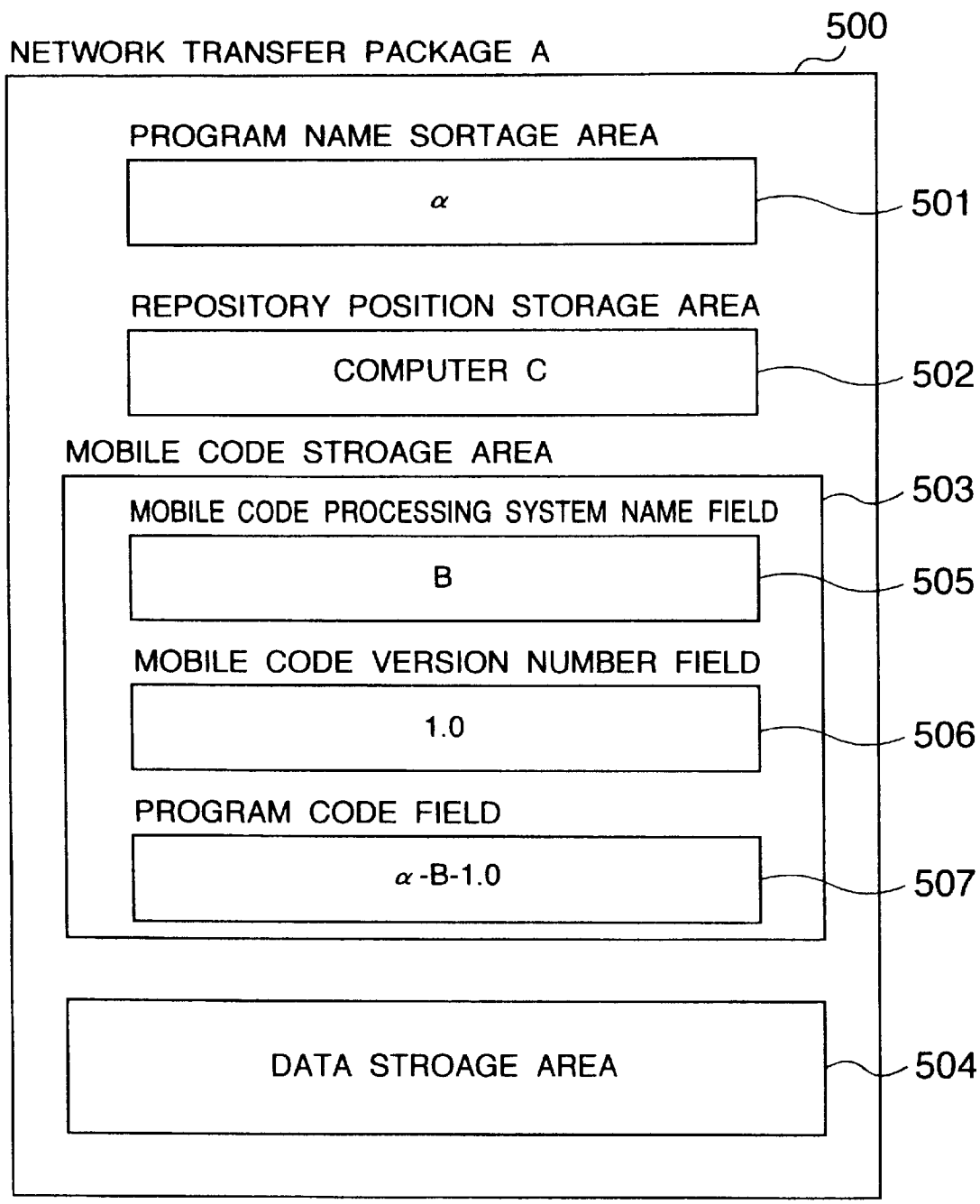
FIG. 2 is a diagram showing the layout of a network transfer package A transferred via a network.

The package A 500 of FIG. 2 is an example of the data layout when a program to be executed is transferred as a set of a mobile code and data via the network 1. It is to be appreciated that the package A 500 can be transferred in the form of the electronic mail or the HTML document in WWW.

The package A 500 includes a program name storage area 501 in which program name α is stored, a repository position storage area 502 in which a repository position name of computer C is stored, a mobile code storage area 503, and a data storage area 504.

The mobile code storage area 503 includes a mobile code processing system name field 505 in which mobile code processing system name B is stored, a mobile code version number field 506 in which version number 1.0 is stored, and a program code field 507 in which program code α-B-1.0 is stored.

Figure 3:
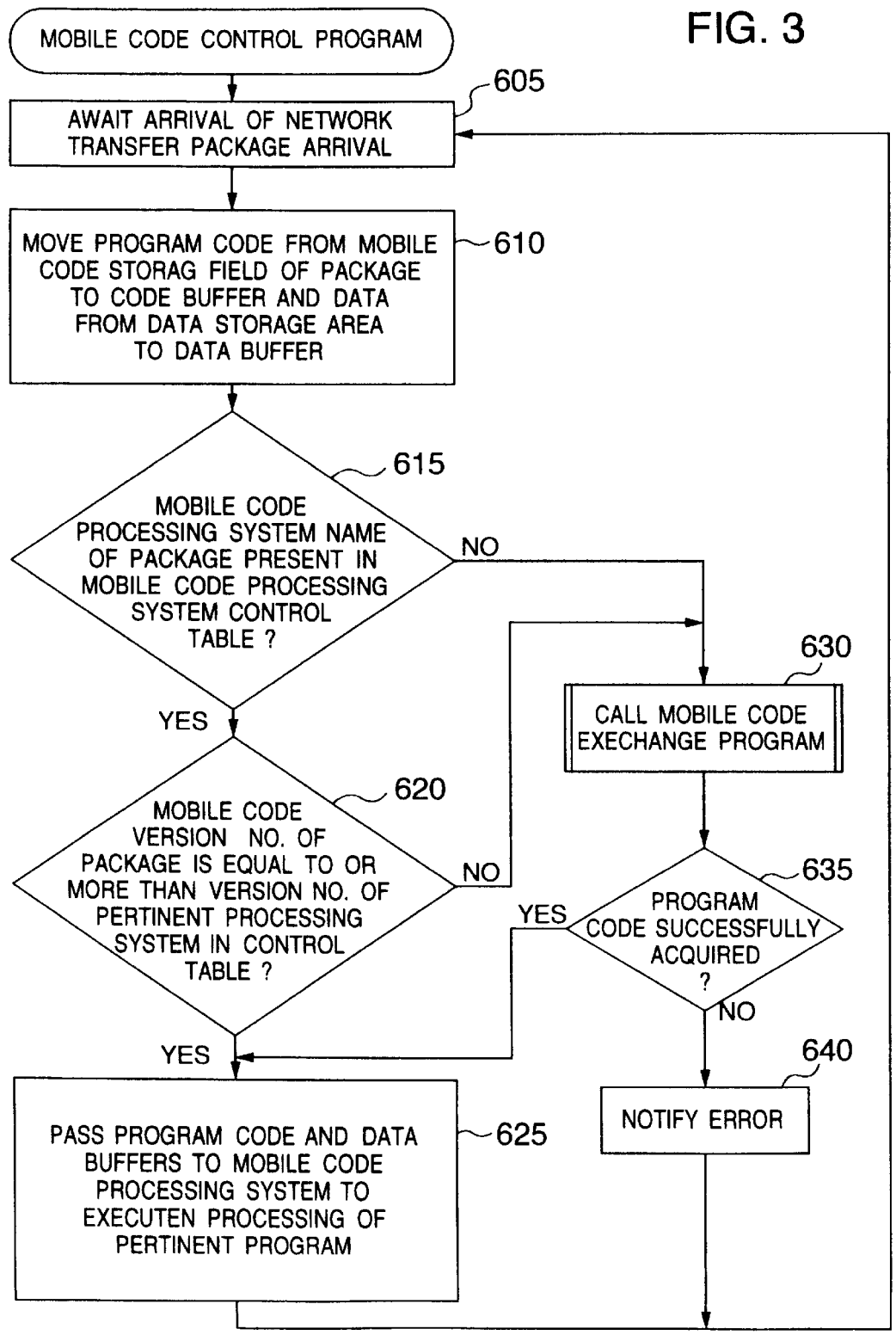
FIG. 3 is a flowchart showing a processing procedure of a mobile code control program.

The package A 500 arrives at the computer A 100 is first processed by the mobile code control program 121 of FIG. 3.

The program 121 waits for arrival of a package A 500 (step 605). On receiving the package A 500, the program 121 accesses the package A 500 and then stores a program code of the program code field 507 of the mobile code storage area 503 in the program code buffer 123 and the contents of the data storage area 504 in the data buffer 124 (step 610).

Subsequently, the program 121 checks to determine whether or not "mobile code processing system name=B" of the package A 500 exists in the processing system control table 130 (step 615).

Since the processing system of the received package is missing in the table of the computer A 100, the program 121 calls the mobile code exchange program 122 (step 630). In this example, since the processing system name "B" is missing, the program 121 calls the exchange program 122.

Figure 4:
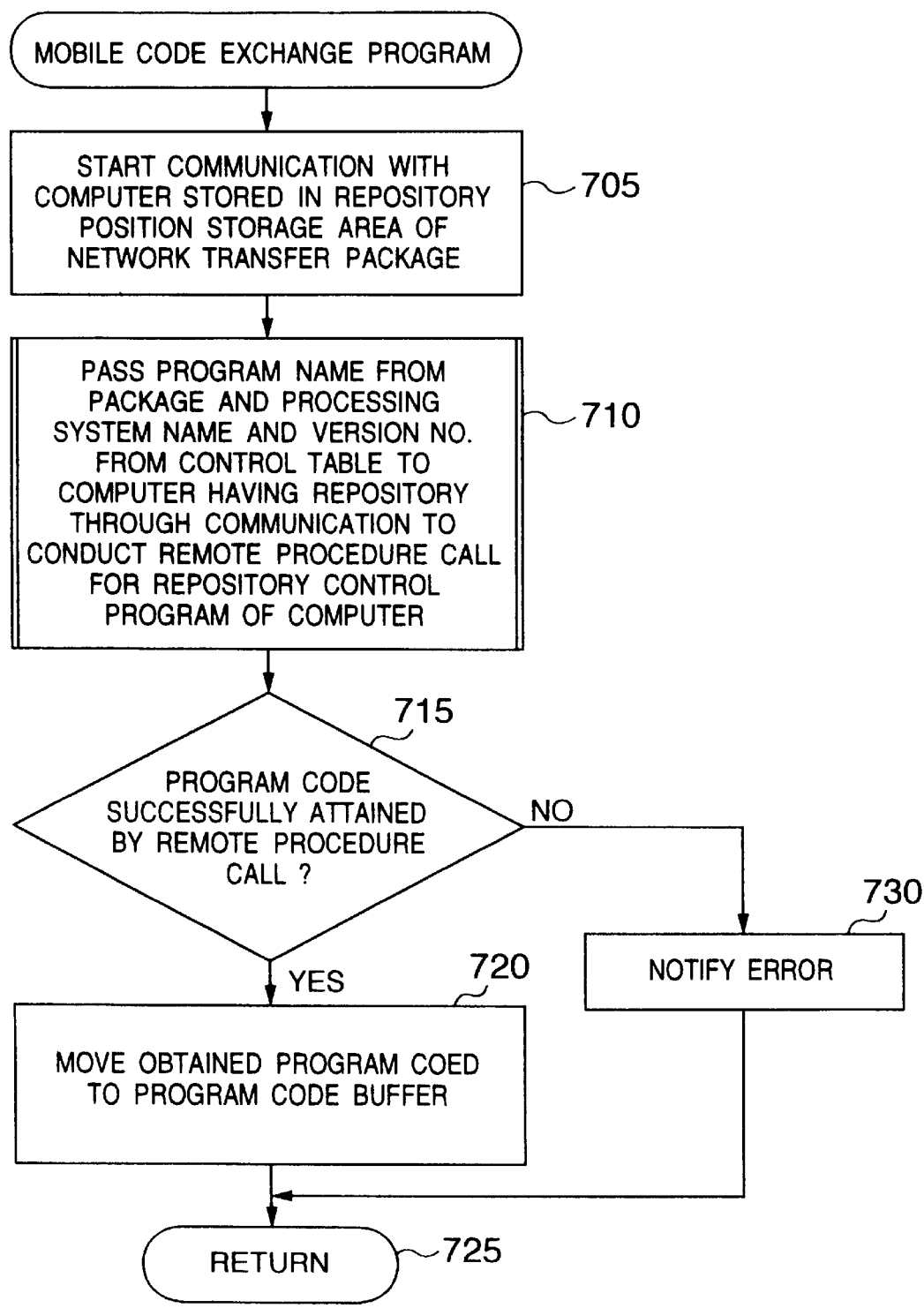
FIG. 4 is a flowchart showing a processing procedure of a mobile code exchange program.

FIG. 4 shows processing accomplished by the exchange program 122.

The program 122 initiates communication with "computer C 300" stored in the repository position storage area 502 of the package A 500 (step 705). The program 122 then collects "program name α" stored in the program name storage area 501 of the package A 500 and the processing system name 131 and version number 132 stored in the table 130 to send the collected items at a time to the computer C 300.

In this example, to obtain an executable program code in accordance with a set of information items including "program name α", "processing system name A", and "version number 1.0", a remote process call is issued to the repository control program 320 of the computer C 300 (step 710).

Figure 5:
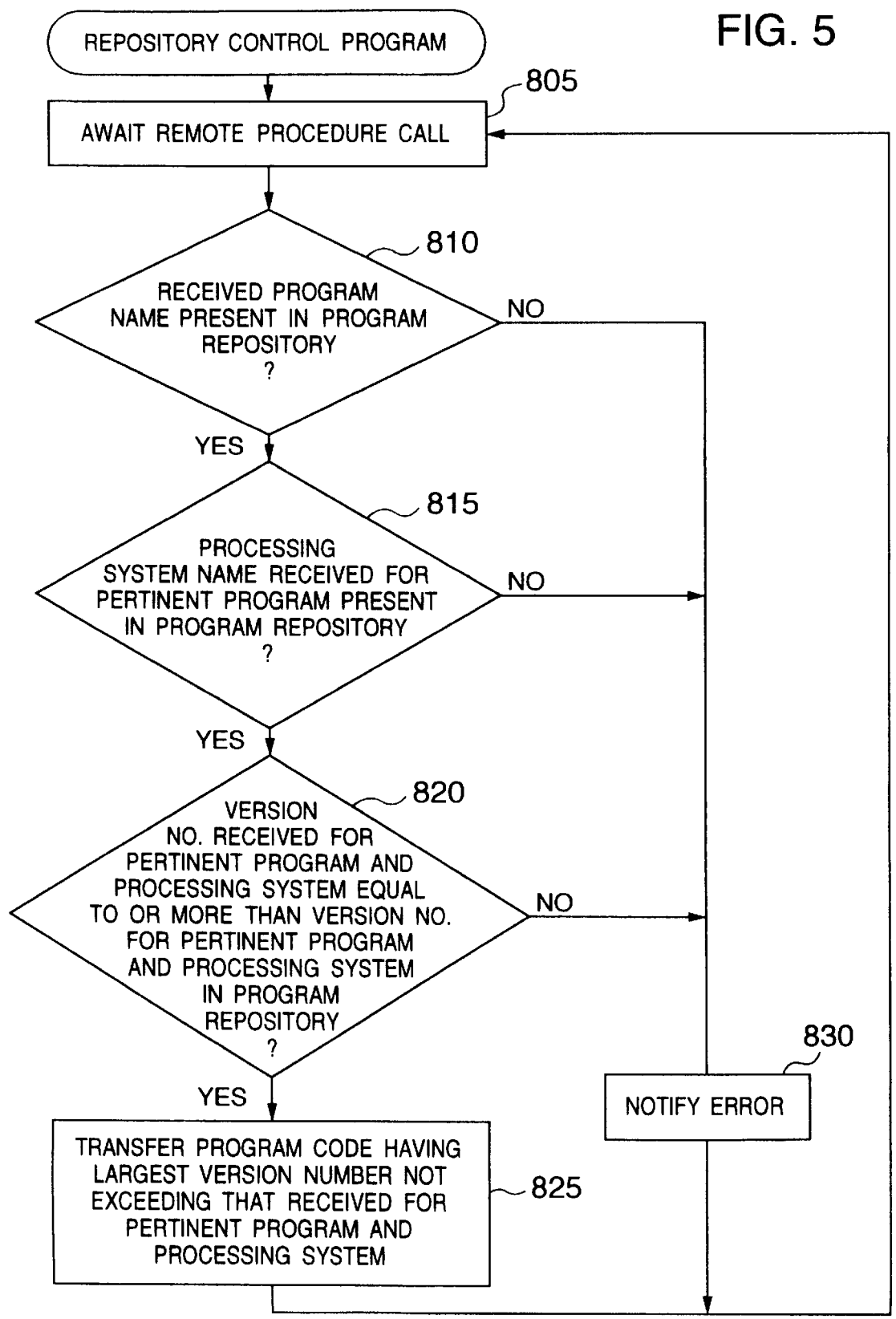
FIG. 5 is a flowchart showing a processing procedure of a repository control program.

FIG. 5 shows processing carried out by the repository control program 320.

The control program 320 awaits a remote procedure call (step 805). On receiving the call, the program 320 examines to determine whether or not a program name thus received is present in the program repository 400 (step 810). If the program name is absent therein, the program 320 reports an error notification (step 830).

If the program name is present, the program 320 accomplishes a check to determine whether or not the program and the processing system name associated with the program system name exist in the program repository 400 (step 815).

In this explanation, since "program name α 420" is present, the program 320 checks to determine whether or not a combination of the program name and the processing system which has a version number not exceeding that received version number (step 820).

In this example, since "processing system name A 440" exists for "program name α", the program 320 calls a program code which corresponds to the combination and which has a version number equal to or less than the received version number and then transfers the program code to the communicating computer (step 825).

In this case, since "version number 1.0 441" is present, the program 320 transfers "α-A-1.0" of the program code field 442 from the repository 400 to the computer A 100 invoked by a remote procedure call and then enters the remote procedure call wait state.

In this regard, an error is notified when the steps 810, 815, or 820 results in "No" (step 830).

Returning now to FIG. 4, description will be given of processing of the mobile code exchange program 122. The program 122 examines to determine whether or not a program code is received from the computer C 300. If the program code is missing, the program 122 issues an error message (step 730).

If the program code is received, the program 122 moves the code to the program code buffer (step 720) and thereafter passes control to the mobile code control program 121 (step 725).

In this description, "program code α-A-1.0 442" has been received. Consequently, the program 122 moves "program code α-A-1.0 442" to the program code buffer 123 and then transfers control to the mobile code control program 121.

Returning to FIG. 3, processing of the control program 121 will be described. First, the program 121 continuously monitors an event of acquisition of a program code (step 635). When it is assumed that a code is attained, the program 121 passes the contents of the program code buffer and data buffer to the pertinent mobile code processing system and then executes processing of the program (step 625). When the program code is not obtained, the program 121 notifies an error (step 640).

In this case, since the program code has been successfully acquired, the program 121 transfers the contents of program code buffer 123 and data buffer 124 to "mobile code processing system A version 1.0 140" and then initiates execution of "program α".

As above, in the configuration of the system, even when the mobile code processing system is missing in the computer A 100 for the mobile code sent from the computer B 200, a program code conforming to the mobile code processing system of the computer A 100 is automatically acquired from the program repository 400 of the computer C 300 to thereby conduct execution of the program. This consequently leads to an advantage that the user of the computer A 100 can conduct data processing in accordance with the mobile code technology without paying attention to the mobile code processing system of the computer A 100.

Additionally, when the provider of the system conforming to the mobile code prepares programs of a plurality of mobile code processing systems in the program repository 400, it is possible to offer the service using the mobile code to a large number of users.

Figure 6:
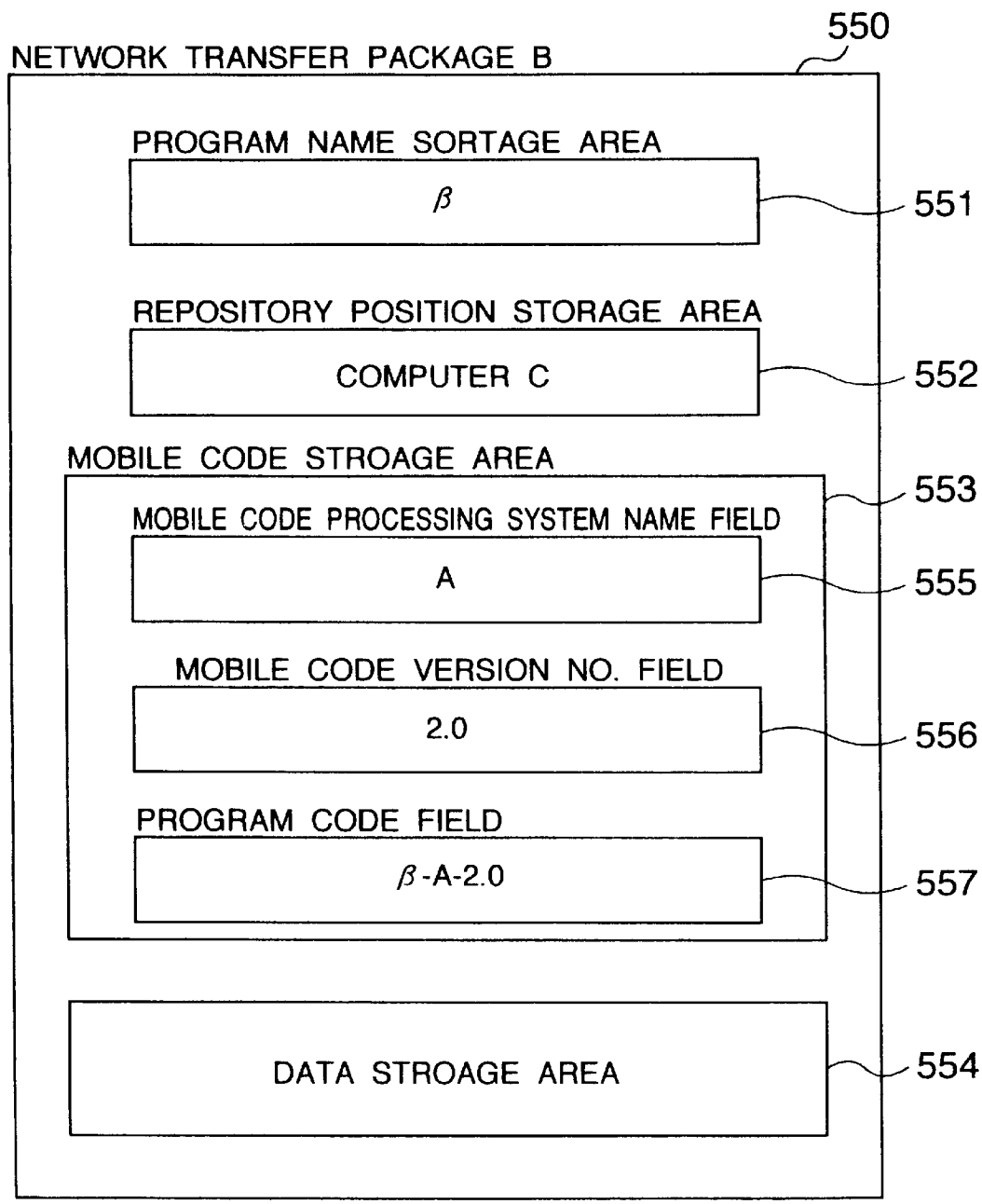
FIG. 6 is a diagram showing a layout of a network transfer package B transferred via a network.

Referring now to FIG. 6, description will be given of another embodiment of the present invention in which the computer B 200 transfers to the computer A 100 a network transfer package B 550 for which the mobile code processing system is missing in the computer A 100 and for which the version of the processing system is mismatching.

The package B 550 of FIG. 6 includes a program name storage area 551 in which "program name β" is stored, a repository position storage area 552 in which a repository position of "computer C" is stored, a mobile code storage area 553, and a data storage area 554.

The mobile code storage area 553 includes a mobile code processing system name field 555 in which "mobile code processing system name A" is stored, a mobile code version number field 556 in which "version number 2.0" is stored, and program code field 557 in which "β-A-2.0" is stored. Stored in the data storage area 554 is data to be processed.

The package B 550 delivered to the computer A 100 is first processed by the mobile code control program 121.

In the computer A 100, the control program 121 waits for arrival of a network transfer package (step 605). When the package B 550 is received, the program 121 moves the program code "β-A-2.0" stored in the program code field 557 of the mobile code storage area 553 from the package B 550 to the program code buffer 123 and then the contents of the data storage area 554 to the data buffer 124 (step 610).

Subsequently, the program 121 checks to determine whether or not "mobile code processing system name A" in the processing name field 555 of the package B 550 is present in the mobile code processing system control table 130 (step 615).

In this description, since "processing system name A" is existing therein, the program 121 determines whether or not the version number in the code version field 556 of the package B 550 is equal to or less than the version number 134 of "processing system name A 133" in the table 130 (step 620).

In this example, the versions "2.0" and "1.0" are compared with each other. Namely, since the version number in the package B 550 is more than that in the table 130, it may possibly occur that the data cannot be executed. To cope with this situation, the program 121 calls the mobile code exchange program 122 (step 630).

As can be seen from the flowchart of FIG. 4, the exchange program 122 first communicates with "computer C 300" stored in the repository position storage area 552 of the package B 550 (step 705).

Next, the program 122 collects "program name β" stored in the storage field 551 of the package B 550 and "processing name A 131" and "version number 1.0 132" stored in the table 130 to send a set of these items to the computer C 300.

In this explanation, the program 122 transmits "processing name A 131" and "version number 1.0 132" thereto and conducts a remote procedure call for the repository control program 320 of the computer C 300 to thereby obtain an executable program code (step 710).

As shown in FIG. 5, the program 320 in the computer C 300 awaits a remote procedure call (step 805). On receiving the call, the program 320 checks to determine whether or not a program name received is present in the repository 400 (step 810).

If the program name is missing therein, the program 320 reports an error message (step 830).

In this case, "program name β 430" is existing and hence the program 320 determines whether or not a processing system name subsequently received is present in the repository 400 (step 815). If the name is missing therein, the program 320 issues an error message (step 830).

Since "processing system name A 440" is present in this example, the program 320 examines to determine whether or not a version number equal to or less than the received version number is present for the pertinent processing system name (step 820). If such a version number is absent, the program 320 notifies an error (step 830).

In this case, since "version number 1.0 461" is present, the program 320 transfers "β-A-1.0" of the program code field 426 from the repository 400 to the computer A 100 having issued the remote procedure call (step 825) and then enters the remote procedure call wait state.

On the other hand, the mobile code exchange program 122 in the computer A 110 examines to determine whether or not a program code is received from the computer C 300. If the program code is not received, the program 122 issues an error message (step 730).

Since the program code "β-A-1.0" is received, the program 122 stores the program code in the program code buffer 123 (step 720) and then transfers control to the mobile code control program 121 (step 725).

Subsequently, as shown in FIG. 3, the program 121 determines whether or not the program code has been acquired (step 635). If the code is not received, the program 121 issues an error message (step 640).

Since the program code has been successfully obtained in this situation, the program 121 passes the contents of the program code buffer 123 and data buffer 124 to "mobile code processing system A version 1.0 140" and then commences execution of program β.

As above, even when the version number of mobile code processing system for the mobile code transferred from the computer B 200 is other than any version number of the mobile code processing system of the computer A 100, there can be attained from the program repository 400 a program code having the version number of the mobile code processing system of the computer A 100 or a program code having a version number of higher possibility of execution, i.e., a largest version number less than the version number of the mobile code processing system of the computer A 100. This brings forth an advantageous effect that the user of the computer A 100 can operate a system conforming to the mobile code technology without paying attention to the version of the mobile code processing system disposed in the computer A 100.

Moreover, the provider of a mobile code system offering a system conforming to the mobile code to many users is only required to prepare programs of a plurality of versions of mobile code processing systems in the program repository.

In the network transfer package described above, the program code and data are transferred at the same time. However, it may also be possible to transfer each of these items as a separate data item.

Additionally, in the program code transfer, a plurality of program codes may be stored in a network transfer package for the simultaneously transfer thereof. Namely, the package includes a plurality of program codes. Thanks to this provision, the types of program codes in a computer which receives program codes from the program repository is increased in the course of system operation. This leads to an advantage of minimization of transfer requests from the computer to the repository.

Furthermore, when the program code having the matching version number is missing in the program repository, it may also be possible to execute by trial the program code received from the computer B 200 such that the error processing is executed only when the program code cannot be normally executed.

Due to this provision, the number of events of error processing is decreased and hence the data processing can be continuously carried out with higher efficiency.

In accordance with the present invention, even when a mobile code processing system of a mobile code transferred from an arbitrary computer via the network is missing in a computer having received the mobile code, a program code for the mobile code processing system of the destination computer can be acquired from the program depository to thereby execute the data processing. This consequently results in an advantage that neither the user who receives a program in the mobile code nor the provider of programs conforming to the mobile code is required to pay attention to the kinds of mobile code processing systems in the data processing.

Similarly, the data processing can be executed without paying attention to the versions of mobile code processing systems.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A data processing method in a computer system including a communication path and a plurality of computers connected via the communication path to each other in which a program is transferred from a source computer to a destination computer to execute the program in the destination computer, comprising the steps of:

allocating at least one of the plural computers as a program repository computer, the repository computer including a program repository in which program names of programs generated in a plurality of different types of program code processing systems, program code processing system names employed to described the respective programs, version numbers respectively of the program code processing systems, and program codes respectively described by the program code processing systems respectively having the version numbers are stored with a correspondence established therebetween;

providing in each of the remaining computes other than the program repository computer a table in which program code processing system names provided therein and the version numbers respectively of the program code processing system names are registered;

transferring, when a program is transferred from a first computer selected from the remaining computers to a second computer selected from the remaining computers, a set of data items including an identifier of a computer in which the program is stored, a program name of the program, a program code processing system name adopted to describe the program, a version number of the program code processing system, and a program code described in a program code processing system having the program code processing system name and the version number;

checking by the second computer having received the set of data items via the transmission path to determine whether or not the program code processing name and the version number in the set exist in the table of program processing system names of the second computer;

executing by the second computer, when the processing system name exists therein, data processing described by the program code of the received program in accordance with the program code processing system of the second computer;

transmitting by the second computer to the program repository computer, when the processing system name is missing therein, the program name thus received, the program code processing system name of the second computer, and the version number of the program code processing system name in accordance with the identifier of the computer which is obtained from the received set and in which the program is stored;

transmitting by the program repository computer to the second computer, when the program repository includes a program associated with the program name, the program code processing name, and the version name of the program code processing system name received from the second computer, a program code corresponding to the program name and the program code processing system name; and executing the received program code by the second computer in accordance with the program code processing system of the second computer.

2. A data processing method according to claim 1, further including the step of:

transmitting by the program repository computer to the second computer, when the program repository includes a program which has a program name and a program code processing system name matching the program name and the program code processing system name received from the second computer and which has a version number of the program code processing system name other than the version number received, a program code which corresponds to the program name and the program code processing system name received and which is assigned with a version number not exceeding the version number received.

3. A data processing method according to claim 2, further including the step of executing by the second computer, when the program code corresponding to the version number is missing in the program repository of the program repository computer, a program code stored in the received program in accordance with the program code processing system of the second computer.

4. A data processing method according to claim 1, further including the step of executing by the second computer, when the program code corresponding to the version number is missing in the program repository of the program repository computer, a program code stored in the received program in accordance with the program code processing system of the second computer.

5. A data processing method in a computer system including a communication path and a plurality of computers connected via the communication path to each other in which a program is transferred from a source computer to a destination computer to execute the program in the destination computer, comprising the steps of:

allocating at least one of the plural computers as a program repository computer, the repository computer including a program repository in which program names of programs generated in a plurality of different types of program code processing systems, program code processing system names employed to described the respective programs, and program codes respectively described by the program code processing systems are stored with a correspondence established therebetween;

providing in each of the remaining computes other than the program repository computer a table in which program code processing system names provided therein are registered;

transferring, when a program is transferred from a first computer selected from the remaining computers to a second computer selected from the remaining computers, a set of data items including an identifier of a computer in which the program is stored, a program name of the program, a program code processing system name adopted to describe the program, and a program code described in a program code processing system having the program code processing system name;

checking by the second computer having received the set of data items via the transmission path to determine whether or not the program code processing name in the set exists in the table of program processing system names of the second computer;

executing by the second computer, when the processing system name exists therein, data processing described by the program code of the received program in accordance with the program code processing system of the second computer;

transmitting by the second computer to the program repository computer, when the processing system name is missing therein, the program name thus received and the program code processing system name of the second computer in accordance with the identifier of the computer which is obtained from the received set and in which the program is stored;

transmitting by the program repository computer to the second computer, when the program repository includes a program associated with the program name and the program code processing name received from the second computer, a program code corresponding to the program name and the program code processing system name; and executing the received program code by the second computer in accordance with the program code processing system of the second computer.

6. A data processing method according to claim 5, further comprising the steps of simultaneously transmitting by the program repository computer to the second computer, when the repository includes a program having a program name and a program code processing system name respectively corresponding to the program name and the program code processing system name received from the second computer, program codes related to another program name in addition to the program code corresponding to the matching program code and the matching program code processing system.

7. A computer-readable recording media for use in a computer system including a communication path and a plurality of computers connected via the communication path to each other in which a program is transferred from a source computer to a destination computer to execute the program in the destination computer, comprising:

code means of computer codes representing a function for awaiting arrival of a package of a set of data items including an identifier of a computer in which the program is stored, a program name of the program, a program code processing system name adopted to describe the program, and a program code described in a program code processing system having the program code processing system name;

code means of computer codes representing a function for checking to determine whether or not the program code processing name in the package exists in a table of program processing system names of the pertinent computer;

code means of computer codes representing a function for transmitting to the program repository computer in which the program in the package is stored, when the program code processing system name is missing therein, the program name thus received and the program code processing system name of the pertinent computer and awaiting arrival of a program from the repository computer in which the program is stored; and code means of computer codes representing a function for executing the program code received from the repository computer in accordance with the program code processing system of the pertinent computer.

* * * * *